(12) United States Patent
Sonsalla et al.

(10) Patent No.: US 12,741,479 B2
(45) Date of Patent: Sep. 22, 2026

(54) MARKING TOOL

(71) Applicant: Milwaukee Electric Tool Corporation, Brookfield, WI (US)

(72) Inventors: Alexander N. Sonsalla, Platteville, WI (US); Andrew M. Tuchscherer, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 368 days.

(21) Appl. No.: 18/524,303

(22) Filed: Nov. 30, 2023

(65) Prior Publication Data

US 2024/0246353 A1 Jul. 25, 2024

Related U.S. Application Data

(60) Provisional application No. 63/481,423, filed on Jan. 25, 2023.

(51) Int. Cl.
*B43K 21/06* (2006.01)
*B43K 24/00* (2006.01)
(Continued)

(52) U.S. Cl.
CPC .............. *B43K 21/06* (2013.01); *B43K 24/00* (2013.01); *B43K 29/001* (2013.01); *G01B 3/163* (2013.01)

(58) Field of Classification Search
CPC ...................................................... B43K 21/06
(Continued)

(56) References Cited

U.S. PATENT DOCUMENTS 3,265,201 A * 8/1966 Edwards ................ B43K 21/06 D8/30
4,744,146 A * 5/1988 Schmidt .................. B26B 5/001 30/162

(Continued)

FOREIGN PATENT DOCUMENTS

FR 3073776 A1 * 5/2019 ............. B43K 23/10
WO WO-2020234247 A1 * 11/2020 ............. B43K 23/00

OTHER PUBLICATIONS

Our Patented Carpenter Pencil Sharpener & Holder, <https://www.safetynailer.com/carpenter-pencil-sharpener-holder>, believed to be commercially available at least by Dec. 13, 2022, Retrieved on Nov. 29, 2023, 2 pages.

(Continued)

*Primary Examiner* — George B Bennett
(74) *Attorney, Agent, or Firm* — Reinhart Boerner Van Deuren s.c.

(57) ABSTRACT

Various embodiments of a hand tool shown a carpenter pencil tool are provided. The carpenter pencil tool includes a holder and a carpenter pencil. The carpenter pencil tool includes an adjustment mechanism that allows a user to change the position of the carpenter pencil relative to the holder when the adjustment mechanism is actuated, improving a user's ability to reach the carpenter pencil. In a specific embodiment, the adjustment mechanism allows a user to change the position of the carpenter pencil with one hand and/or a thumb. In various embodiments, the carpenter pencil tool holder includes a recess on an outer surface configured to engage and hold the carpenter pencil. When the carpenter pencil is held within the recess a pointed object can be extended through the holder at a chosen location to create a compass.

20 Claims, 7 Drawing Sheets

(51) Int. Cl.
*B43K 29/00* (2006.01)
*G01B 3/16* (2006.01)

(58) Field of Classification Search
USPC .......................................................... 434/391
See application file for complete search history.

(56) References Cited

U.S. PATENT DOCUMENTS

| | | | | |
|---|---|---|---|---|
| 5,044,805 | A * | 9/1991 | Kosteniuk .............. | B43K 24/04 401/86 |
| 5,235,754 | A * | 8/1993 | Sirois ........................ | B43L 9/04 33/27.01 |
| 5,890,290 | A * | 4/1999 | Davis ...................... | B26B 29/02 30/162 |
| 6,739,065 | B2 * | 5/2004 | Hofmeister ............ | A47G 1/205 33/666 |
| 6,948,250 | B1 * | 9/2005 | Caiafa, Jr. ............... | B26B 5/001 30/162 |
| 7,178,244 | B2 * | 2/2007 | Fossella .................... | B26B 5/00 30/162 |
| 7,823,294 | B2 * | 11/2010 | Contreras ............... | B43L 9/007 33/27.03 |
| 8,408,832 | B2 * | 4/2013 | Andochick ............ | B43K 25/00 401/48 |
| 9,428,001 | B2 * | 8/2016 | Candela ................. | B43K 25/00 |
| 10,603,947 | B2 | 3/2020 | Ballard | |
| 2005/0193568 | A1 * | 9/2005 | Peyrot ..................... | B26B 29/02 30/162 |

OTHER PUBLICATIONS

PencilYoyo Carpenter Pencil Holder Orange, <https://thehammerstroke.com/product/pencilyoyo-carpenter-pencil-holder-orange/>, believed to be commercially available at least by Dec. 13, 2022, Retrieved on Nov. 29, 2023, 6 pages.

Magnetic Carpenter Pencil Clip, <https://www.atlas46.com/online-store/Magnetic-Carpenter-Pencil-Clip%E2%84%A2-p465623118>, believed to be commercially available at least by Dec. 13, 2022, Retrieved on Nov. 29, 2023, 3 pages.

* cited by examiner

MARKING TOOL

CROSS-REFERENCE TO RELATED PATENT APPLICATION

The present application claims the benefit of and priority to U.S. Provisional Application No. 63/481,423 filed on Jan. 25, 2023, which is incorporated herein by reference in its entirety.

BACKGROUND OF THE INVENTION

The present invention relates generally to the field of tools. The present invention relates specifically to a marking or drafting tool that acts as a holder for a marking instrument and/or as a compass. In general, marking or drafting tools are used by carpenters or builders to make measurements, mark lines, etc.

SUMMARY OF THE INVENTION

One embodiment of the invention relates to a carpenter pencil tool including a holder and a pencil positioned within the holder. The holder extends along a longitudinal axis between a first and a second end, the holder including an opening at the first end. The pencil extending along a longitudinal axis and through the opening of the holder. The pencil includes a tip. The carpenter pencil tool includes an adjustment mechanism including an elongated slot and a slide button extending through the elongated slot. The slide button is configured to engage and move the pencil relative to the holder. The carpenter pencil tool further including a retention component positioned within the holder. The retention component is configured to apply a retention force on the pencil to move the pencil into engagement with the holder to resist movement of the pencil. The pencil is adjustable between a non-extended position in which the tip of the carpenter pencil extends a first distance beyond the opening of the holder and an extended position in which the tip of the carpenter pencil extends a second distance beyond the opening of the holder.

Another embodiment of the invention relates to a carpenter pencil tool including a holder and a carpenter pencil. The holder extends along a longitudinal axis between a first end and a second end. The holder includes a body including opposing side walls, a plurality of openings extending through the opposing side walls of the body, a cavity, an opening connected to the cavity and positioned at the first end, and a recess defined in an outward facing surface of the body. The carpenter pencil includes a tip and is positionable within the holder. When the carpenter pencil is in a holding position, the carpenter is positioned within the cavity of the holder. When the carpenter pencil is in a compass position, the carpenter pencil is positioned in the recess.

Another embodiment of the invention relates to a carpenter pencil tool including a holder and a carpenter pencil. The holder extends along a longitudinal axis between a first and a second end. The holder including an opening at the first end, a cavity connected to the opening, a plurality of openings extending through opposing side walls of the holder, and a recess defined in an outward facing surface of the holder. The holder further includes an adjustment mechanism. The adjustment mechanism includes a slot defined in a wall of the holder, the wall extends between and connects the opposing side walls and a slide button extending through the slot. The carpenter pencil tool further includes a retention component positioned within the holder and a carpenter pencil. The carpenter pencil includes a tip and is positionable within the holder.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
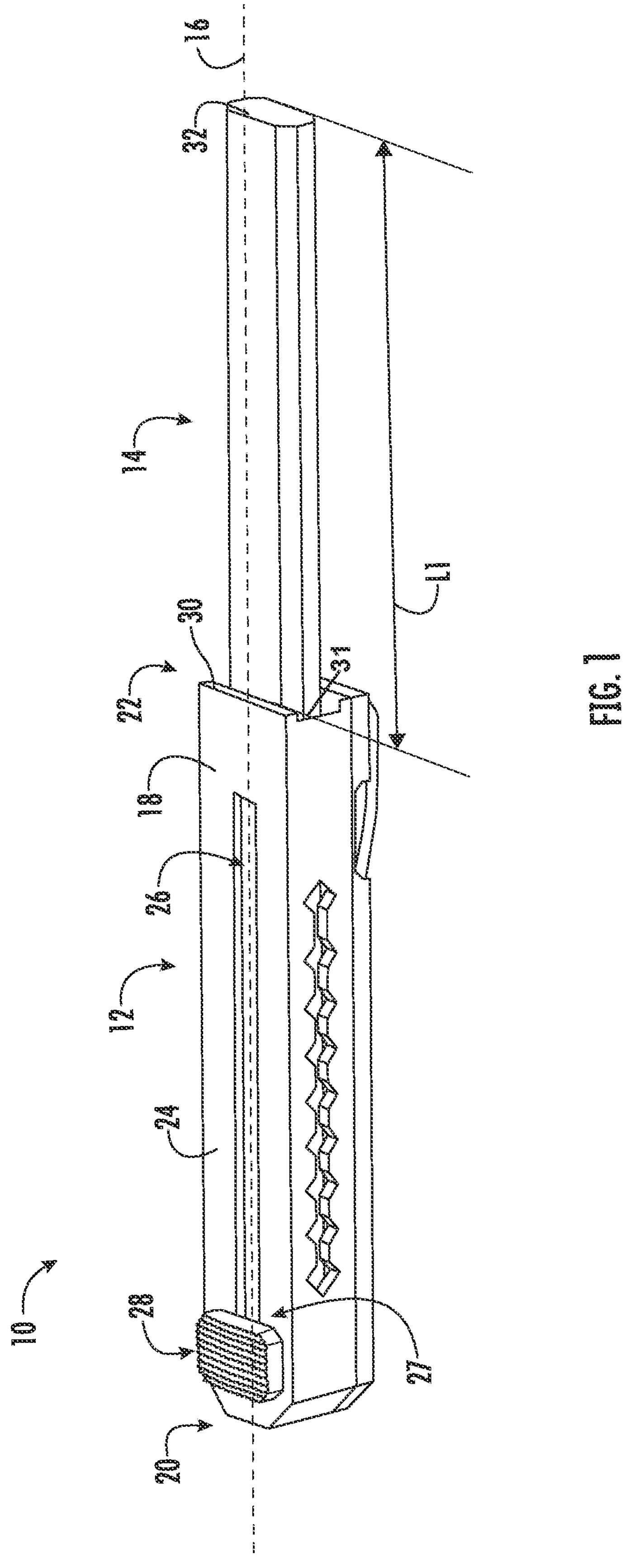
FIG. 1 is a perspective view of a carpenter pencil tool in a first, non-extended position, according to an exemplary embodiment.

Referring generally to the figures, a marking tool, shown as a carpenter pencil tool is shown according to an exemplary embodiment. Applicant has developed a number of improvements to carpenter pencil tools as described herein. In contrast to the carpenter pencil tool discussed herein, many carpenter pencil tools or holders may have difficulty securing and/or releasing the carpenter pencil from the holder within the working environment (e.g., on ladders, roofs, etc.). Applicant has designed an adjustment mechanism that allows a user to change the position of the carpenter pencil relative to the holder of the tool with one hand. The adjustment mechanism allows the user to alter the position of the carpenter pencil which can then be more easily accessed or grasped within the working environment (i.e., on a ladder, roof, etc.). In a specific embodiment, the adjustment mechanism includes a sliding device positioned for ease of access that can be actuated by a single hand or thumb. The adjustability of the carpenter pencil tool allows a user to reach and release the carpenter pencil when positioned in a variety of locations (i.e., attached to tool belt, clipped to pants, etc.), while the ability to perform the adjustment with a single hand allows for use when a second hand may not be available (i.e., holding workpiece, ladder, etc.).

Further, many carpenter pencil tools merely act as holders for the carpenter pencil or provide a way to attach to the carpenter pencil. Applicant has designed a compact carpenter pencil tool that provides additional functionality to the tool. In the specific embodiment, discussed herein the carpenter pencil tool includes structure providing compass functionality. The holder of the carpenter pencil tool extends along a longitudinal axis and includes a longitudinal cavity in which the carpenter pencil is received and/or secured within when the carpenter pencil tool is acting as a holder. An outer wall of the holder includes a recess configured to receive and engage the carpenter pencil when the carpenter pencil tool is being used as a compass. When the carpenter pencil is positioned within the recess, the carpenter pencil extends in a generally perpendicular direction to the longitudinal axis of the holder and/or the longitudinal cavity. A pointed object (i.e., nail, pin etc.) is extended through an opening in the holder in a direction generally parallel to the carpenter pencil at a desired location to act as the needle point or center point of the compass.

Applicant believes the carpenter pencil tool discussed herein that allows for use both as a holder and a compass, reduces the number of tools/markers a worker needs to carry, thereby increasing the efficiency of the worker. Similarly, the multi-functionality is useful for carpenters and/or builders who work in environments where it may be difficult or inconvenient to carry around more than one marking tool (i.e., carpenter's pencil for free hand marking, scribe compass and pencil, etc.).

Additionally, the holder design of the carpenter pencil tool discussed herein is sized to be used with carpenter pencils of various lengths (i.e., 17.8 cm, 24 cm, 30 cm, etc.), creating a carpenter pencil tool compatible with a variety of carpenter pencils. Designing a holder compatible with multiple sizes of a marking instruments reduces the number of marking instruments a worker needs to carry and/or interact with, again increasing the efficiency of the worker.

Figure 2:
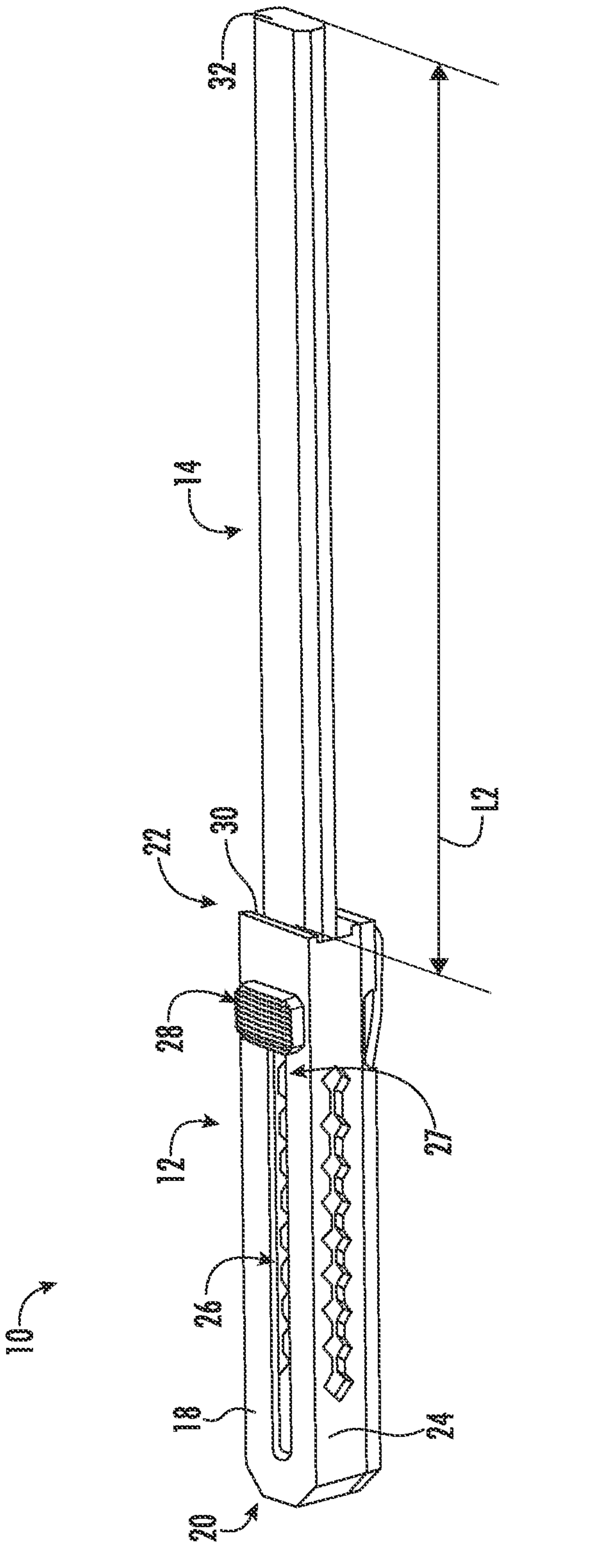
FIG. 2 is a perspective view of the carpenter pencil tool of FIG. 1 in a second, extended position, according to an exemplary embodiment.

Referring to FIGS. 1-2, a marking or drafting tool, shown as a carpenter pencil tool 10, is shown. As will be discussed in greater detail below, carpenter pencil tool 10 is usable as a holder 12 to facilitate use of a carpenter pencil and also as a compass. Carpenter pencil tool 10 includes a holder and a pencil, shown as a carpenter pencil 14. As will be generally understood, a carpenter pencil is designed for use in construction environments (e.g., drawing or marking wood, building materials, etc.). In contrast to regular pencils, a carpenter pencil typically has a body or shaft with an elliptical or rectangular cross-sectional shape that prevents the carpenter pencil from rolling away, improves case of gripping (larger surface area), and allows for use of wider and thicker lead. Furthermore, the shape and lead density of a carpenter pencil allows for both thin, precision line markings and thick markings necessary for rough surfaces by rotating the carpenter pencil to specific angles.

Holder 12 includes a body 18 that extends along a longitudinal axis 36 (see e.g., FIG. 3) between a first end, shown as a gripping end 20 and a second end, shown as an opposing engagement or pencil end 22. Body 18 includes an upper or top wall 24 (in the orientation shown in FIGS. 1-2) with an opening, shown as elongated slot 26 defined in top wall 24. Body 18 has a length defined between gripping end 20 and engagement end 22. In various specific embodiments, body 18 has a length greater than 3 inches, specifically greater than 3.5 inches, and more specifically greater than 4 inches. In a specific embodiment, body 18 has a length of about 4.134 inches (e.g., 4.134 inches plus or minus 0.1 inches).

Elongated slot 26 extends along longitudinal axis 36 of holder 12. A first end of elongated slot 26 is positioned adjacent to engagement end 22 of the holder 12 and an opposing second end of elongated slot 26 is positioned adjacent to gripping end 20 of holder 12. A length of elongated slot 26 is defined between the first end and the second end. In various specific embodiments, elongated slot 26 has a length greater than 2.5 inches, specifically greater than 3 inches and more specifically greater than 3.2 inches. In a specific embodiment, elongated slot 26 has a length of about 3.274 inches (e.g., 3.274 inches plus or minus 0.1 inches).

In various embodiments, the elongated slot 26 has a length greater than 60% of the length of body 18, specifically greater than 70%, and more specifically greater than 75%. In a specific embodiment, the length of elongated slot 26 is about 79.2% of the length of body 18 (e.g., 79.2% plus or minus 2%).

An adjustment mechanism 27 includes elongated slot 26 and a switching device or slider, shown as slide button 28 that moves carpenter pencil 14 toward and/or away from a user and engagement end 22 of the body when slide button 28 is actuated by the user. The adjustability of the carpenter pencil 14 allows a user to more easily grasp and/or remove carpenter pencil 14 from holder 12 regardless of the location where carpenter pencil tool 10 is attached (e.g., tool belt, pants, etc.). Applicant believes the adjustment mechanism 27 discussed herein improves case of access to carpenter pencil 14 for a user.

Figure 3:
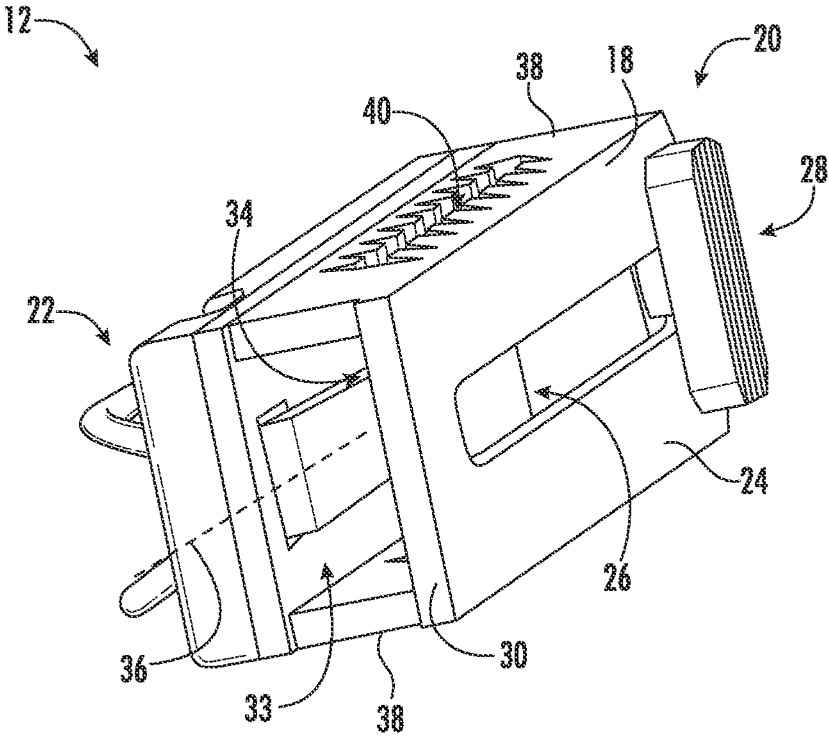
FIG. 3 is a front perspective view of the handle of the carpenter pencil tool of FIG. 1, according to an exemplary embodiment.

As shown in FIG. 3, holder 12 and specifically body 18 includes a cavity 34. Cavity 34 extends along longitudinal axis 36 of holder 12. At engagement end 22, an opening shown as front opening 33 connects to cavity 34. Engagement end 22 further includes a front wall 30 connected to top wall 24 of body 18. Body 18 further includes opposing side walls 38 that each connect to top wall 24 and front wall 30. An elongated opening 40 is defined in each side wall 38.

When carpenter pencil tool 10 is assembled, carpenter pencil 14 is positioned within and/or received within cavity 34 and extends out of front opening 33. In such a position, a longitudinal axis 16 of carpenter pencil 14 is generally parallel to longitudinal axis 36 of holder 12. In a specific embodiment, longitudinal axis 16 of carpenter pencil 14 is colinear with longitudinal axis 36 of holder 12. When a user actuates slide button 28, carpenter pencil 14 and specifically a front surface or tip 32 of carpenter pencil 14 is moved relative to holder 12. Carpenter pencil 14 extends between tip 32 and an opposing gripping or engagement end 31.

As shown in FIG. 1, when carpenter pencil 14 is in a first non-extended position in which slide button 28 is positioned at gripping end 20, carpenter pencil 14 extends a first distance or length, L1 from front wall 30 and is securely held within holder 12. L1 is defined between front wall 30 of body 18 and tip 32 of carpenter pencil 14. When a user actuates slide button 28, carpenter pencil 14 moves into one of the various extended positions. In a second, extended position (see e.g., FIG. 2) carpenter pencil 14 extends a second distance or length, L2 from front wall 30. L2 is similarly defined between front wall 30 of body 18 and tip 32 of carpenter pencil 14. L2 is greater than L1.

In a specific embodiment, adjustment mechanism 27 allows for a range of adjustment or extension of carpenter pencil 14. In other words, carpenter pencil 14 is adjustable between a non-extended position in which the tip 32 extends a first distance beyond the opening of holder 12 and an extended position in which the tip 32 of carpenter pencil 14 extends a second distance beyond the opening of the holder 12.

Applicant believes this increased exposed length of carpenter pencil 14 improves ease of access for a user by reducing the distance a user has to reach carpenter pencil 14, while also avoiding other conventional methods for securing carpenter pencil (e.g., clipping, retractable line, screwing into holder, etc.) that may be difficult or awkward for a single hand.

Figure 4:
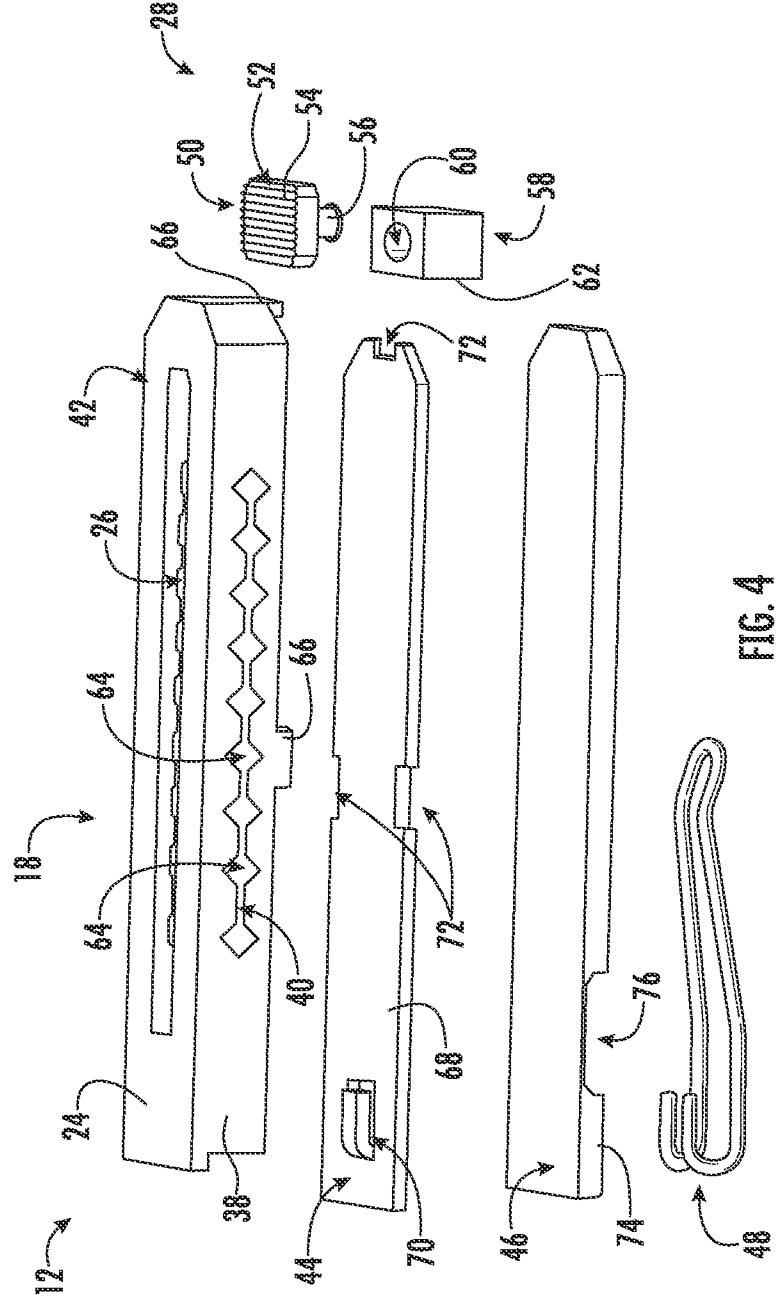
FIG. 4 is an exploded view of the handle of FIG. 3, according to an exemplary embodiment.

Referring to FIG. 4, an exploded view of holder 12 is shown, according to an exemplary embodiment. In a specific embodiment, body 18 is formed from an upper body portion 42, a lower body portion 44, and a base 46. In various other embodiments, body 18 may be formed from a single, integral component.

Slide button 28 includes a user engagement portion 50 with an actuating surface 52. In a specific embodiment, actuating surface 52 includes a plurality of protrusions 54. Engagement portion 50 of slide button 28 further includes a connector 56 extending inward, toward cavity 34 when holder 12 is assembled. Connector 56 couples to a pencil engagement portion 58 that includes a recess 60 configured to receive and hold connector 56. Pencil engagement portion 58 includes an engagement surface 62 that interfaces against and provides a force onto carpenter pencil 14 to move carpenter pencil 14 as a user actuates slide button 28. Specifically, engagement surface 62 interfaces against gripping end 31 of carpenter pencil 14. When holder 12 is assembled, engagement surface 62 faces front opening 33. In other words, when a user applies a force to the slide button 28 greater than the retention force applied by the holder 12, the carpenter pencil 14 moves through the opening of the holder 12.

Engagement portion 50 extends in a generally parallel (i.e., parallel plus or minus 10 degrees) orientation to a surface of wall 38 of holder 12 and is positionable adjacent to both gripping end 20 of holder 12 and engagement end 22. Slide button 28 and specifically engagement portion 50 faces in a direction away from carpenter pencil 14.

As previously discussed, slide button 28 is positioned along a length of holder 12 defined between the gripping end 20 and the engagement end 22. In various embodiments, slide button 28 is positionable in uppermost (defined as engagement end) 30% of holder 12 and the lowermost (defined as gripping end) 30% of holder. In various embodiments, slide button 28 is positionable in the uppermost 25% of holder 12 and the lowermost 25% of holder 12. In other words, due to the length of elongated slot 26 relative the length of holder 12, slide button 28 is movable along a majority of the length of holder 12 allowing for increased adjustability and for using carpenter pencil tool 10 with carpenter pencils of various lengths (i.e., 17.8 cm, 24 cm, 30 cm, etc.).

Upper body portion 42 and specifically elongated opening 40 includes a plurality of shaped openings 64 positioned along elongated opening 40 and extending through side walls 38. As will be discussed in greater detail below, openings 64 can be configured and/or shaped to receive a pointed object when carpenter pencil tool 10 is being used as a compass. Each opening 64 provides a discrete location for marking a workpiece at a specific distance or measurement. Upper body portion 42 further includes a plurality of projections 66. Projections 66 extend downward, toward lower body portion 44 and are configured to couple to lower body portion 44.

Lower body portion 44 includes a plurality of recessed portions 72 configured to receive and couple to projection 66. Lower body portion 44 further includes an upward facing surface 68 that faces upper body portion 42. A retention component, shown as spring 70 extends inward from upward facing surface 68. Spring 70 pushes against carpenter pencil 14 to secure and/or hold carpenter pencil 14 within holder 12. In other words, spring 70 extends inward from a first (upward facing in the orientation shown in FIG. 4) toward a second opposing surface 90 (downward in the orientation shown in FIG. 4) of holder 12 and when the spring applies the retention force on carpenter pencil 14, the carpenter pencil 14 moves into engagement with downward facing surface 90 (see e.g., FIG. 8) to hold and/or secure carpenter pencil 14 within holder 12.

Base 46 includes an outward facing surface 74. A recess 76 is defined in outward facing surface 74. Recess 76 is configured to retain carpenter pencil 14 when it is in the compass position. A clip 48 is coupled to base 46. Clip 48 is configured to attach to an object such as a belt, tool bag, or pants of the user. Clip 48 additionally helps retain carpenter pencil 14 in the compass position. In other words, when carpenter pencil 14 is in a holding position, the carpenter pencil 14 is positioned in the cavity 34 and when the carpenter pencil 14 is in a compass position, the carpenter pencil 14 is positioned in the recess 76.

Figure 5:
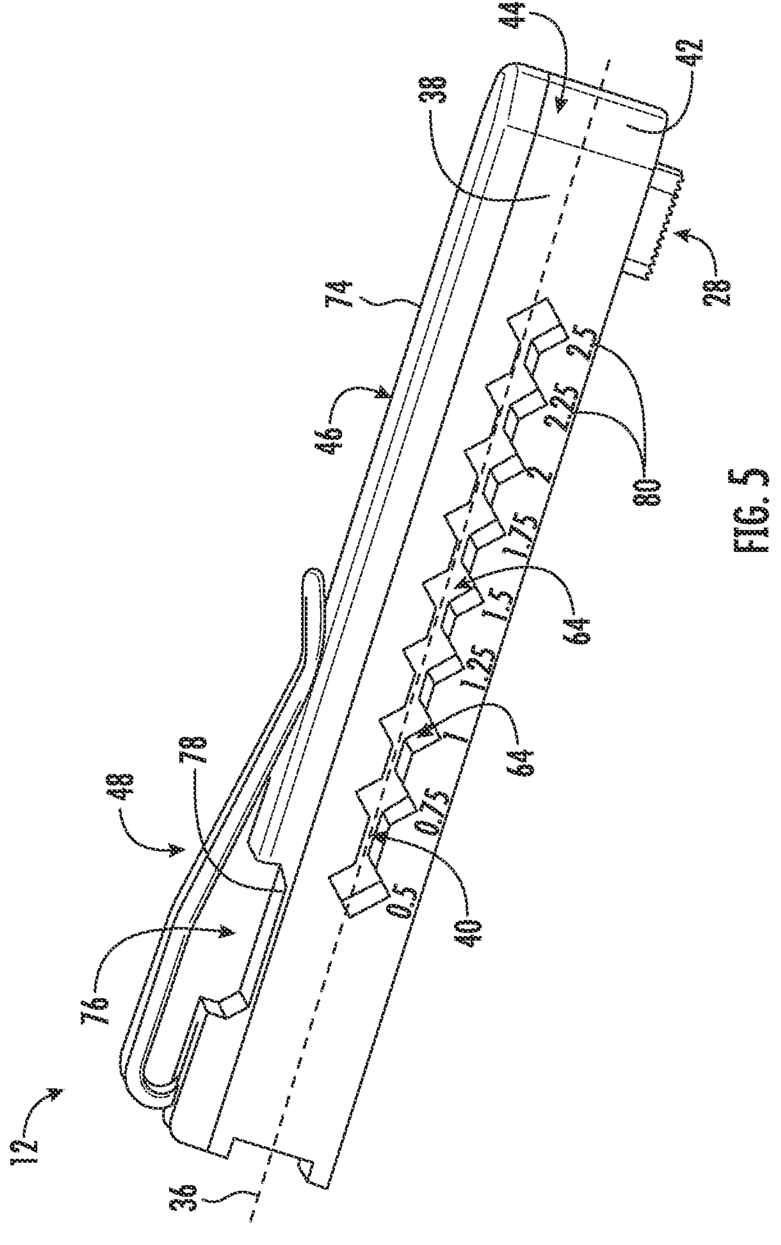
FIG. 5 is a left perspective view of the handle of FIG. 3, according to an exemplary embodiment.

Referring to FIG. 5, a left perspective view of holder 12 is shown according to an exemplary embodiment. Recess 76 of holder 12 includes a surface 78. Surface 78 faces and interfaces against carpenter pencil 14 when carpenter pencil 14 is in the compass position. In a specific embodiment, each opening 64 includes an indicia or marking indicating to the user a distance to carpenter pencil 14 from opening 64 which determines a radius of a circle or arc or and/or a marking distance created using carpenter pencil tool 10.

Figure 6:
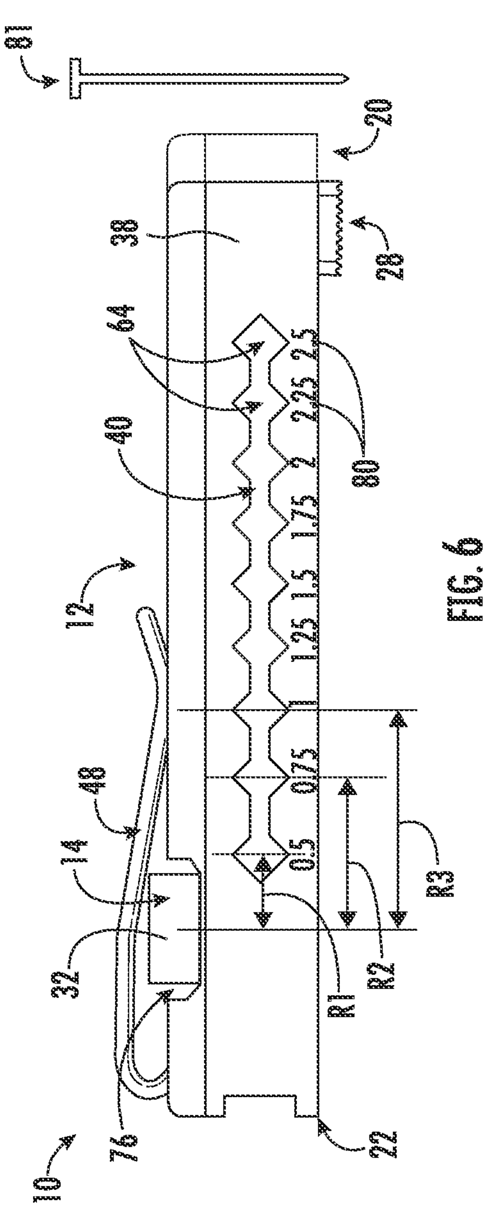
FIG. 6 is a left side view of the carpenter pencil tool of FIG. 1 with the carpenter's pencil in a compass position, according to an exemplary embodiment.

Referring to FIG. 6, a left side view of carpenter pencil tool 10 with carpenter pencil 14 in a compass position is shown according to an exemplary embodiment. In the compass position, carpenter pencil 14 is positioned within recess 76 and below clip 48 (in the orientation shown in FIG. 6) at engagement end 22 of holder 12. When the carpenter pencil 14 is in the holding position, the carpenter pencil 14 extends along the longitudinal axis 36 of the holder 12. In contrast, the carpenter pencil 14 extends in a generally perpendicular (i.e., 90 degrees plus or minus 10 degrees) direction to the longitudinal axis 36 of the holder 12 and/or cavity 34. A distance between tip 32 and a center point of a first opening 64 defines a first radius R1.

When a user extends a pointed object, shown as nail 81 through the first opening 64, nail 81 acts as the needle point of the compass as carpenter pencil 14 draws a circle or arc with a radius R1 or simply marks a distance equal to R1. Nail 81 is extended through the holder 12 and specifically through one of the openings 64 in a direction generally parallel to the carpenter pencil 14 at a desired location or distance.

A second opening 64 is positioned along elongated opening 40. Second opening 64 is positioned between first opening 64 and gripping end 20 of holder 12. A distance between tip 32 and a center point of second opening 64 defines a second radius R2. A third opening 64 is positioned along elongated opening 40. Third opening 64 is positioned between second opening 64 and gripping end 20 of holder 12. A distance between tip 32 and a center point of second opening 64 defines a third radius R3.

In a specific embodiment, body 18 includes 9 openings 64 such that 9 distances and/or radiuses can be marked using carpenter pencil tool. In other embodiments, a different number of openings 64 are defined in body 18 (i.e., 4, 5, 6, 7, 10, etc.). In a specific embodiment, a distance between the centers of adjacent openings 64 is a ¼ inch. In various specific embodiments, carpenter pencil tool 10 can be used as a compass from ½ an inch to 2½ inches. In various specific embodiments, openings 64 are sized and/or shaped for use with a 16D nail.

Figure 7:
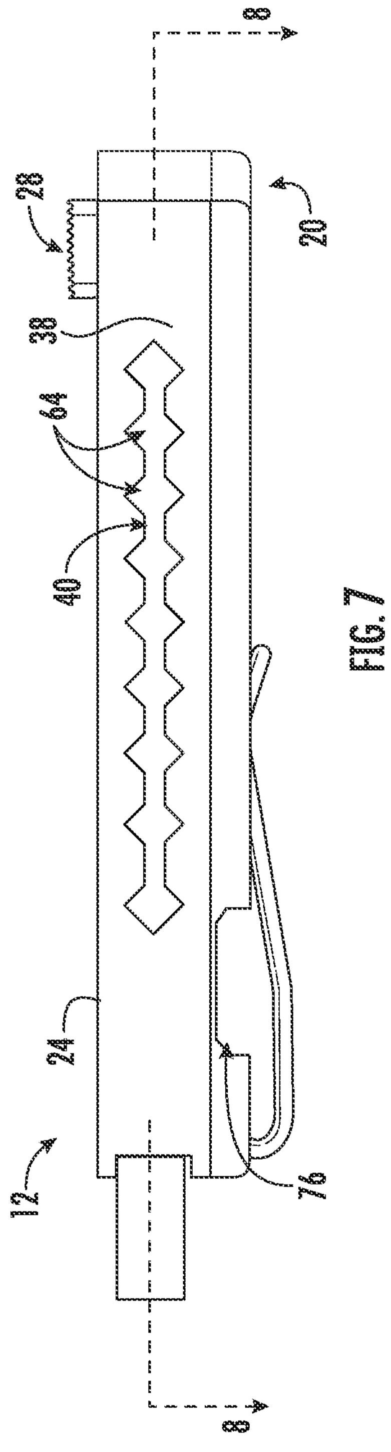
FIG. 7 is a right side view of the carpenter pencil tool of FIG. 1 with the carpenter's pencil in the holder position, according to an exemplary embodiment.
Figure 8:
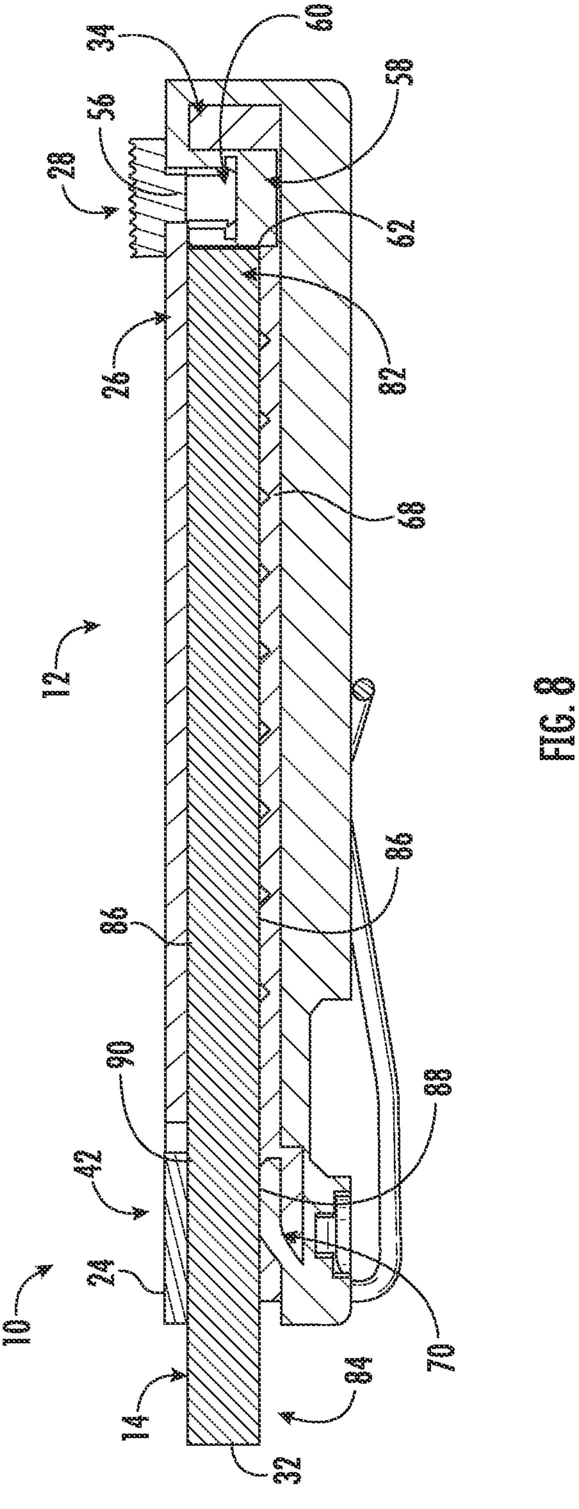
FIG. 8 is a cross-sectional view taken along line 8-8 in FIG. 7, according to an exemplary embodiment.

Referring to FIGS. 7-8, views of carpenter pencil tool 10 in the first, non-extended position are shown, according to an exemplary embodiment. As previously discussed, when carpenter pencil 14 is in the non-extended position, slide button 28 is positioned at gripping end 20. The carpenter pencil 14 extends through front opening 33 and is securely held within holder 12. Spring 70 engages with carpenter pencil 14 and provides a retention force onto carpenter pencil 14. The retention force pushes and/or presses carpenter pencil 14 and specifically side surfaces 86 of carpenter pencil 14 against a downward facing surface 90 of top wall 24. Downward facing surface 90 of top wall 24 faces toward upward facing surface 68 and an upward or inward facing surface 88 of spring 70. In other words, spring 70 pushes carpenter pencil 14 into downward facing surface 90 to hold or retain carpenter pencil 14 within holder 12 resisting the movement of carpenter pencil 14 out of holder 12.

Referring to FIG. 8, a cross-sectional view of carpenter pencil tool 10 showing details of the engagement between slide button 28 and carpenter pencil 14 are shown, according to an exemplary embodiment. The engagement surface 62 of pencil engagement portion 58, interfaces against and provides a moving or adjustment force onto a distal end 82 of carpenter pencil 14 to move carpenter pencil 14 as the user actuates slide button 28. Distal end 82 of carpenter pencil 14 is positioned within cavity 34 and opposes proximal end 84. Proximal end 84 of carpenter pencil 14 includes tip 32.

When the user actuates slide button 28, connector 56 moves through elongated slot 26 on top wall 24 while engagement portion 58 slides or moves along upward facing surface 68 of body 18. As slide button 28 and carpenter pencil 14 are moved within body 18, the amount (i.e., length) of carpenter pencil 14 positioned outside of body 18 increases, allowing the user to more easily reach and grasp carpenter pencil 14. When the user is finished with carpenter pencil 14, carpenter pencil 14 can be returned to body 18 through front opening 33 and slide button 28 can be moved in a direction toward gripping end 20. Because the amount of carpenter pencil 14 positioned outside of body 18 is decreased, carpenter pencil 14 is securely held within holder 12.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A carpenter pencil tool comprising:
- a holder extending along a longitudinal axis between a first end and a second end, the holder comprising:
  - an opening at the first end;
  - opposing side walls; and
  - a plurality of openings extending through the opposing side walls;
- a pencil positioned within the holder, the pencil extending along the longitudinal axis and through the opening of the holder, the pencil comprising a tip;

an adjustment mechanism comprising:
an elongated slot; and
a slide button extending through the elongated slot, the slide button configured to engage and move the pencil relative to the holder; and
a retention component positioned within the holder, the retention component configured to apply a retention force on the pencil to move the pencil into engagement with the holder to resist movement of the pencil;
wherein the pencil is adjustable between a non-extended position in which the tip of the pencil extends a first distance beyond the opening at the first end of the holder and an extended position in which the tip of the pencil extends a second distance beyond the opening at the first end of the holder.

2. The carpenter pencil tool of claim 1, wherein, when a user applies a force to the slide button greater than the retention force, the pencil moves through the opening of the holder.

3. The carpenter pencil tool of claim 1, wherein the holder has a first length defined between the first end and the second end, and wherein the elongated slot has a second length defined between a first end of the elongated slot and a second end of the elongated slot.

4. The carpenter pencil tool of claim 3, wherein the second length of the elongated slot is greater than 75% of the first length of the holder.

5. The carpenter pencil tool of claim 1, the holder further comprising a cavity extending along the longitudinal axis and connected to the opening of the holder.

6. The carpenter pencil tool of claim 5, wherein the retention component is positioned in the cavity adjacent to the opening of the holder.

7. The carpenter pencil tool of claim 6, wherein the retention component extends inward from a first surface of the holder toward a second surface of the holder, and wherein, when the retention component applies the retention force on the pencil, the pencil moves into engagement with the second surface of the holder.

8. The carpenter pencil tool of claim 1, wherein the retention component is a spring.

9. The carpenter pencil tool of claim 1, further comprising a recess defined in an outward facing surface of the holder, the recess sized to receive the pencil.

10. A carpenter pencil tool comprising:
a holder extending along a longitudinal axis between a first end and a second end, the holder comprising:
a body comprising:
opposing side walls;
a plurality of openings extending through the opposing side walls of the body;
a cavity;
an opening connected to cavity and positioned at the first end; and
a recess defined in an outward facing surface of the body;
a carpenter pencil comprising a tip, the carpenter pencil positionable within the holder;
wherein, when the carpenter pencil is in a holding position, the carpenter pencil is positioned within the cavity of the body, and wherein, when the carpenter pencil is in a compass position, the carpenter pencil is positioned in the recess.

11. The carpenter pencil tool of claim 10, wherein, when the carpenter pencil is in the holding position the carpenter pencil extends along the longitudinal axis of the holder.

12. The carpenter pencil tool of claim 11, wherein, when the carpenter pencil is in the compass position, the carpenter pencil extends in a generally perpendicular direction to the longitudinal axis of the holder.

13. The carpenter pencil tool of claim 10, wherein, when the carpenter pencil is in the compass position and a pointed object is extended through one of the plurality of openings in a direction generally parallel to the carpenter pencil, the pointed object acts as a center point such that the carpenter pencil tool is usable as a compass.

14. The carpenter pencil tool of claim 13, wherein a distance between the tip of the carpenter pencil and the pointed object defines a radius of an arc made by the carpenter pencil.

15. The carpenter pencil tool of claim 10, further comprising a clip coupled to the outward facing surface of the body, wherein the clip extends over the recess.

16. The carpenter pencil tool of claim 10, further comprising:
an adjustment mechanism comprising:
an elongated slot; and
a slide button extending through the elongated slot, the slide button configured to engage and move the carpenter pencil relative to the holder; and
a retention component positioned within the holder.

17. A carpenter pencil tool comprising:
a holder extending along a longitudinal axis between a first end and a second end, the holder comprising:
an opening at the first end;
a cavity connected to the opening;
a plurality of openings extending through opposing side walls of the holder; and
a recess defined in an outward facing surface of the holder;
an adjustment mechanism comprising:
a slot defined in a wall of the holder, the wall extends between and connects the opposing side walls; and
a slide button extending through the slot; and
a retention component positioned within the holder; and
a carpenter pencil comprising a tip, the carpenter pencil positionable within the holder.

18. The carpenter pencil tool of claim 17, wherein, when the carpenter pencil is positioned within the cavity, the carpenter pencil extends through the opening of the holder.

19. The carpenter pencil tool of claim 17, wherein the opening at the first end of the holder extends through the holder in a first direction and wherein the plurality of openings extend through the holder in a second direction generally perpendicular to the first direction.

20. The carpenter pencil tool of claim 19, wherein, when the carpenter pencil is positioned within the recess, the carpenter pencil is oriented in the second direction.

* * * * *